UNITED STATES PATENT OFFICE.

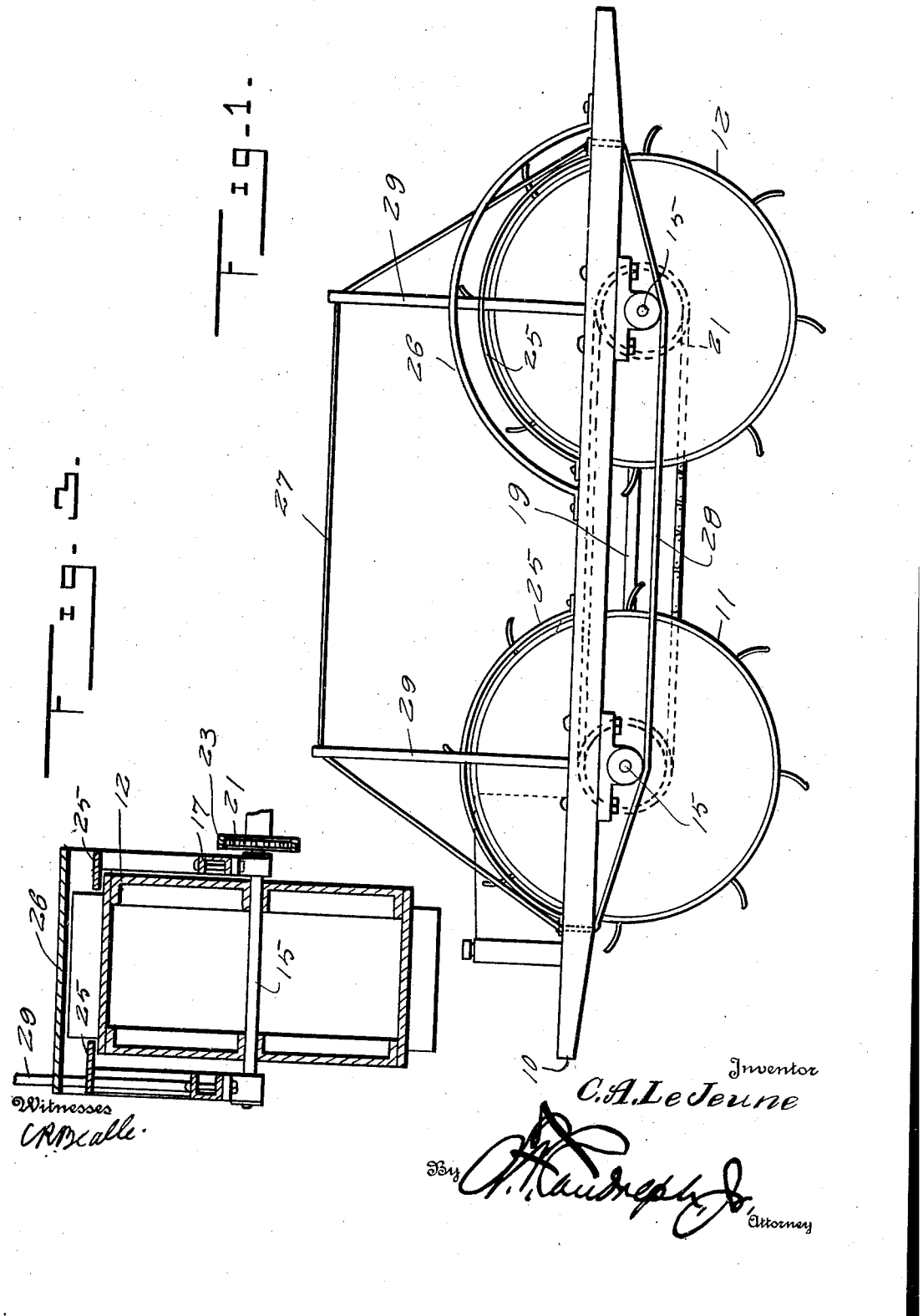

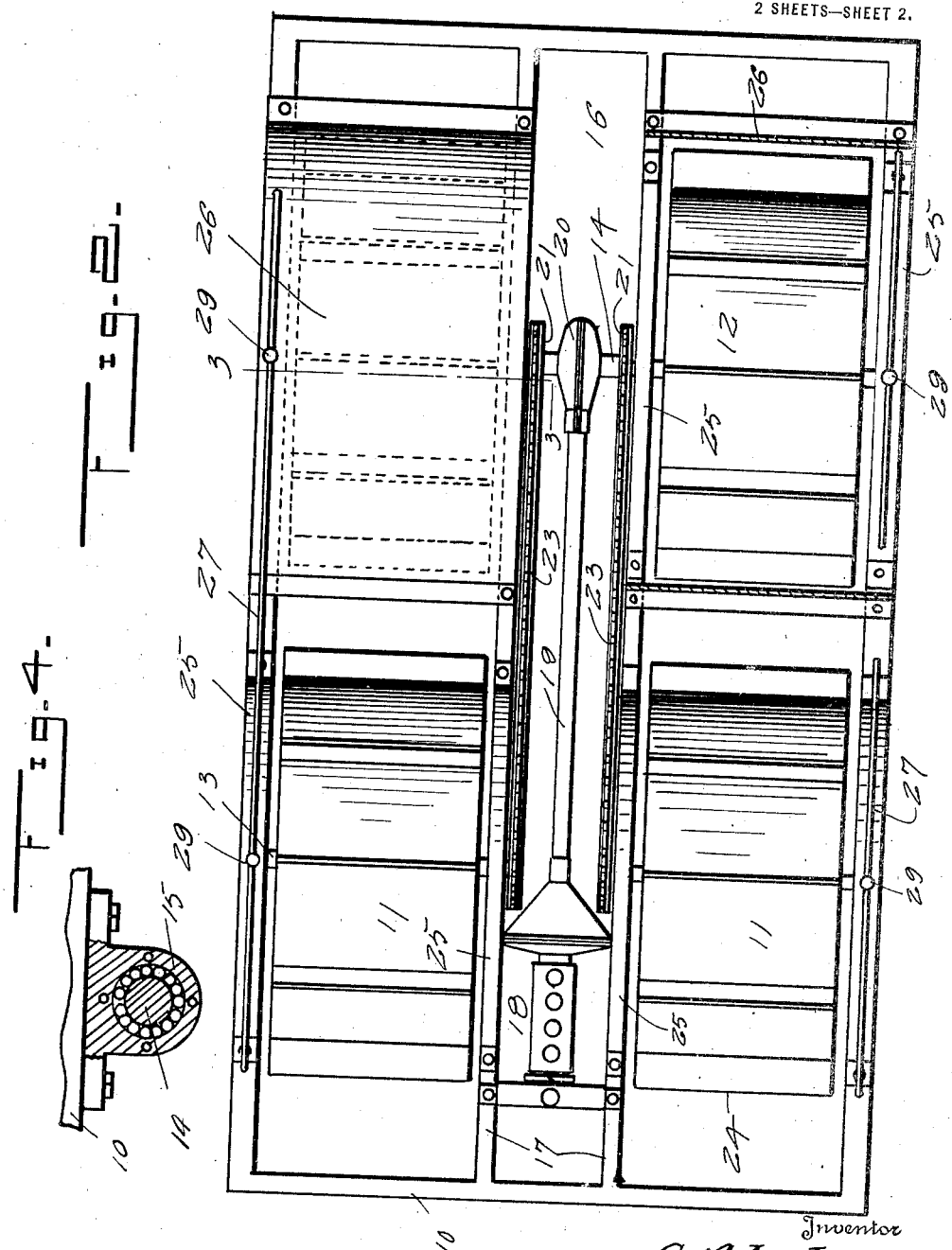

CHARLES A. LE JEUNE, OF BURTON, LOUISIANA.

WATER-AUTOMOBILE.

1,341,375. Specification of Letters Patent. Patented May 25, 1920.

Application filed April 20, 1918. Serial No. 229,825.

*To all whom it may concern:*

Be it known that I, CHARLES A. LE JEUNE, a citizen of the United States, residing at Burton, in the parish of St. James and State of Louisiana, have invented certain new and useful Improvements in Water-Automobiles; and I do hereby declare the following to be a full, clear, and exact description of the invention, such as will enable others skilled in the art to which it appertains to make and use the same.

The object of the invention is to provide a simple and relatively inexpensive water craft of the automobile or cycle type, which may be used either for pleasure touring or as an offensive craft in warfare, for scouting purposes or in attacking submarines and the like, the same being provided with means whereby relatively rapid progress may be made with comparative safety, and being equipped for remaining afloat even in the event of disaster or injury to one or more of its driving elements.

Further objects and advantages will appear hereinafter in the course of the following description, it being understood that changes in form, proportion and details may be resorted to, within the scope of the appended claims, without departing from the spirit of the invention.

In the drawings:

Figure 1 is a side view of a vehicle constructed in accordance with the invention.

Fig. 2 is a plan view of the same.

Fig. 3 is a transverse vertical section on the plane indicated by the line 3—3 of Fig. 2.

Fig. 4 is a detail sectional view of one of the anti-friction shaft bearings.

Within a suitable framework 10, which is generally of rectangular form, and may be economically constructed of angle iron or the equivalent thereof, are arranged the rotary floats 11 and 12, the former being arranged forward and the latter aft of the frame and having shafts 13 and 14 mounted in suitable bearings 15, which are preferably provided with anti-friction means, as indicated in detail in Fig. 4. Within an inner central space 16 bounded by parallel bars or elements 17 of the frame is arranged a motor 18 which may be of the explosive engine type connected by a driving shaft 19 and gearing 20 with the shafts 14 of the rear rotary floats 12 which in turn are connected by sprockets 21 and 22 and chains 23 with the shafts 13 of the forward floats.

These floats are preferably of cylindrical form having an air-tight shell to the exterior surface of which are attached propeller blades 24, curved rearwardly in the direction of rotation so as to avoid lifting water and thus throwing it upon the supporting surfaces of the craft. This curvature of the blades is clearly indicated in Fig. 1.

Secured terminally to the frame at convenient points and spanning the floats are safety straps 25 which, in the event of injury to the shaft of a float, serve to maintain the latter in proper position to maintain the buoyancy and equilibrium of the vessel, and by disconnecting the driving chain from the injured float, the craft may be propelled by means of the remaining floats. Also arranged to cover the rear, or if desired all of the floats are water shields 26, one of such shields being shown in Fig. 1 and in Fig. 2.

It will be understood that any desired means for guiding the craft or determining its direction of movement may be employed, many of the well known and improved means now used in connection with water craft being applicable in this connection, and therefore it is deemed unnecessary to specifically illustrate the same herein.

As a means of strengthening the framework, upper and lower truss frames may be employed, the same consisting of the truss rods 27 and 28, and the upper strut 29, the lower truss rods being extended beneath the bearings 15 for the shafts of the driving elements consisting of the rotary floats.

It will also be understood that any desired or preferred construction of housing may be arranged upon and supporting by the frame for the convenience and protection of the operator and crew together with such offensive weapons as may be required in carrying out the specific purpose of the craft. As the details of equipment are foreign to the particular invention involved herein, specific illustration thereof is deemed unnecessary.

Having described the invention, what is claimed is:

1. In a water vehicle, a frame, rotatable floats journaled in the frame and disposed to maintain an even balance thereof, means for propelling the floats, longitudinally bowed straps secured to the frame upon opposite sides of each of the rotary floats and spanning the same, the straps being adapted to engage the floats to retain the same against vertical movement should the journal of one of the same become broken.

2. A water craft having a main frame, fore and aft rotary floats arranged in pairs, the elements of which are arranged upon opposite sides of the longitudinal center of the said frame, a driving engine and gearing for communicating motion of said engine to the shaft of said rotary floats, arranged in the space between said floats, safety straps carried by the frame and spanning the floats respectively, and water shields, also spanning the floats, to prevent the splashing of water upon the deck of the craft.

In testimony whereof I affix my signature in presence of two witnesses.

CHARLES A. LE JEUNE.

Witnesses:
 CHERRET J. SCHEXNAILDRE,
 GEORGE THOMAS ADMIRE.